(12) United States Patent
Nakatogawa et al.

(10) Patent No.: US 12,526,537 B2
(45) Date of Patent: Jan. 13, 2026

(54) IMAGING APPARATUS, DEPTH MAP GENERATION METHOD, AND PROGRAM

(71) Applicant: Japan Display Inc., Tokyo (JP)

(72) Inventors: Hirondo Nakatogawa, Tokyo (JP); Yoshiro Aoki, Tokyo (JP); Hitoshi Tanaka, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/905,238

(22) Filed: Oct. 3, 2024

(65) Prior Publication Data

US 2025/0126369 A1 Apr. 17, 2025

(30) Foreign Application Priority Data

Oct. 11, 2023 (JP) .................. 2023-176071

(51) Int. Cl.
 *H04N 23/95* (2023.01)
 *G06T 3/40* (2024.01)
 *G06T 7/55* (2017.01)
 *G06T 7/571* (2017.01)

(52) U.S. Cl.
 CPC ............... *H04N 23/95* (2023.01); *G06T 3/40* (2013.01); *G06T 7/55* (2017.01); *G06T 2207/20104* (2013.01); *G06T 2207/20212* (2013.01); *G06T 2207/30252* (2013.01)

(58) Field of Classification Search
 CPC ........... H04N 23/95; G06T 7/55; G06T 7/751; G06T 3/40; G06T 2207/20104; G06T 2207/20212; G06T 2207/30252; G06V 20/58; G01C 3/32
 See application file for complete search history.

(56) References Cited

U.S. PATENT DOCUMENTS

| | | | |
|---|---|---|---|
| 8,280,194 B2* | 10/2012 | Wong ................. | G02B 27/0075 345/660 |
| 8,773,570 B2 | 7/2014 | Kimura et al. | |
| 9,270,970 B2* | 2/2016 | Ishii ..................... | H04N 13/128 |
| 10,122,939 B2* | 11/2018 | Matsuoka .............. | G06T 7/571 |
| 10,419,741 B2* | 9/2019 | Calpe Maravilla ... | G01S 7/4814 |
| 10,432,852 B2* | 10/2019 | Nakayama ............. | H04N 23/95 |
| 10,623,661 B2* | 4/2020 | Oh .......................... | G06T 11/00 |
| 10,645,281 B1* | 5/2020 | Yu .......................... | G06T 3/4053 |

(Continued)

FOREIGN PATENT DOCUMENTS

WO   2011/158508 A1   12/2011

OTHER PUBLICATIONS

"Coded Aperture Pairs for Depth from Defocus and Deblurring" C. Zhou, S. Lin and S.K. Nayar, International Journal of Computer Vision, vol. 93, No. 1, pp. 53, May 2011.

*Primary Examiner* — Brian P Yenke
(74) *Attorney, Agent, or Firm* — Michael Best & Friedrich LLP

(57) ABSTRACT

An arithmetic control unit executes: an imaging process of controlling a coded imaging system to capture an image of a subject by coded imaging and obtain a first captured image; an image generation process of reducing resolution of the first captured image to obtain a second captured image; a partial region setting process of setting a partial region in the first captured image; a process of performing a first decoding process on a partial image corresponding to the partial region in the first captured image to obtain a first depth map; and a process of performing a second decoding process on the second captured image to obtain a second depth map.

20 Claims, 8 Drawing Sheets

(56) References Cited

U.S. PATENT DOCUMENTS

| | | | |
|---|---|---|---|
| 10,897,558 B1* | 1/2021 | Sun | G06T 5/20 |
| 11,308,592 B2* | 4/2022 | Hiasa | G06T 5/20 |
| 2011/0227950 A1* | 9/2011 | Suzuki | H04N 23/62 |
| | | | 345/173 |
| 2011/0267507 A1* | 11/2011 | Kane | G06T 7/571 |
| | | | 348/E5.079 |
| 2013/0063566 A1* | 3/2013 | Morgan-Mar | G06T 7/571 |
| | | | 348/46 |
| 2013/0101177 A1* | 4/2013 | Yamada | G06T 7/246 |
| | | | 382/107 |
| 2013/0113962 A1* | 5/2013 | Li | H04N 5/2621 |
| | | | 348/240.2 |
| 2013/0266210 A1* | 10/2013 | Morgan-Mar | G06T 7/571 |
| | | | 382/154 |
| 2014/0105520 A1* | 4/2014 | Matsumoto | G06T 11/60 |
| | | | 382/284 |
| 2014/0368615 A1* | 12/2014 | van Baar | G01S 17/894 |
| | | | 382/154 |
| 2015/0022518 A1* | 1/2015 | Takeshita | G06T 15/205 |
| | | | 345/419 |
| 2015/0116464 A1* | 4/2015 | Tanaka | H04N 13/271 |
| | | | 382/154 |
| 2016/0150219 A1* | 5/2016 | Gordon | H04N 13/254 |
| | | | 348/46 |
| 2016/0269709 A1* | 9/2016 | Lin | H04N 13/271 |
| 2016/0381342 A1* | 12/2016 | Matsuoka | G06T 5/50 |
| | | | 348/47 |
| 2018/0249143 A1* | 8/2018 | Calpe Maravilla | G01S 17/89 |
| 2019/0198540 A1* | 6/2019 | Shibata | G06T 3/40 |
| 2023/0206476 A1* | 6/2023 | Lyu | G06T 7/55 |
| | | | 382/294 |
| 2024/0354977 A1* | 10/2024 | Nakatogawa | G06T 7/50 |
| 2024/0386592 A1* | 11/2024 | Tanaka | G06T 7/571 |
| 2025/0239843 A1* | 7/2025 | Primm | A47G 1/02 |

* cited by examiner

| REFERENCE METHOD | |
|---|---|
| OPERATION RANGE | ENTIRE SCREEN |
| IMAGE AREA | 5 × 5 (RELATIVE VALUE) |
| NUMBER OF PIXELS PER UNIT AREA (RESOLUTION) | 4 × 4 (RELATIVE VALUE) |
| NUMBER OF POINT SPREAD FUNCTIONS USED IN ONE-TIME DECODING | 25 |
| NUMBER OF TIMES OF DECODING PER UNIT TIME | 60 |
| AMOUNT OF OPERATIONS | 600,000 (RELATIVE VALUE) |

FIG. 9
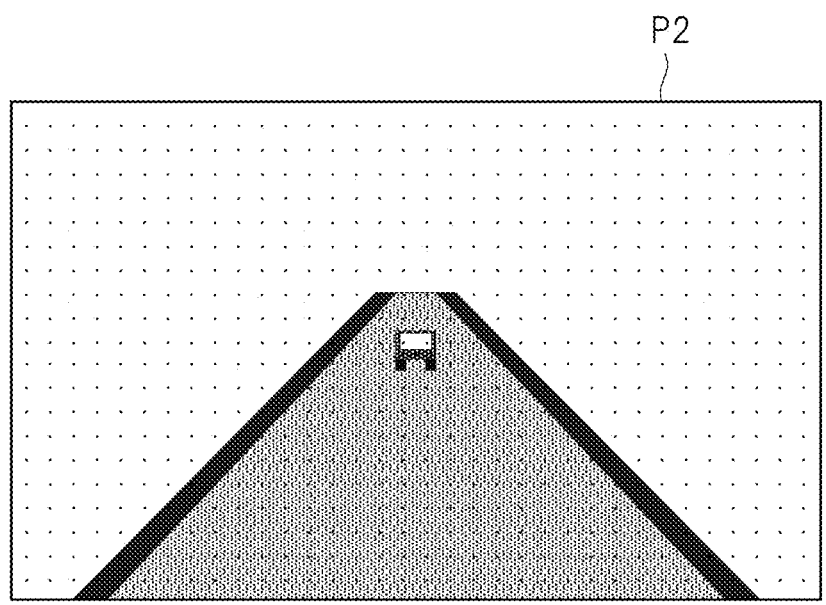
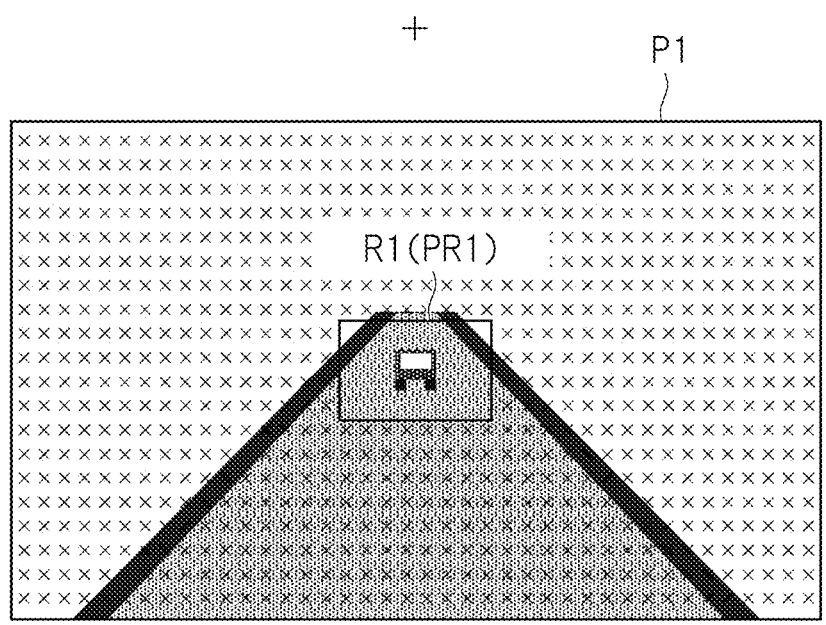

FIG. 10

| METHOD ACCORDING TO PRESENT EMBODIMENT | | | |
|---|---|---|---|
| OPERATION RANGE | PARTIAL IMAGE | WHOLE IMAGE | TOTAL |
| IMAGE AREA (RELATIVE VALUE) | 1×1 | 5×5 | |
| NUMBER OF PIXELS PER UNIT AREA (RELATIVE VALUE) | 4×4 | 1×1 | |
| NUMBER OF POINT SPREAD FUNCTIONS USED IN ONE-TIME DECODING | 25 | 5 | |
| NUMBER OF TIMES OF DECODING PER UNIT TIME | 60 | 15 | |
| AMOUNT OF OPERATIONS (RELATIVE VALUE) | 24,000 | 1,875 | 25,875 |

FIG. 11

| | REFERENCE METHOD | METHOD ACCORDING TO PRESENT EMBODIMENT | | |
|---|---|---|---|---|
| OPERATION RANGE | WHOLE IMAGE | PARTIAL IMAGE | WHOLE IMAGE | TOTAL |
| IMAGE AREA (RELATIVE VALUE) | 5×5 | 1×1 | 5×5 | - |
| NUMBER OF PIXELS PER UNIT AREA (RELATIVE VALUE) | 4×4 | 4×4 | 1×1 | - |
| NUMBER OF POINT SPREAD FUNCTIONS USED IN ONE-TIME DECODING PROCESS | 25 | 25 | 5 | - |
| NUMBER OF TIMES OF DECODING PER UNIT TIME | 60 | 60 | 15 | - |
| AMOUNT OF OPERATIONS (RELATIVE VALUE) | 600,000 | 24,000 | 1,875 | 25,875 |

FIG. 12

|  | REFERENCE METHOD | METHOD ACCORDING TO PRESENT EMBODIMENT | | |
|---|---|---|---|---|
| OPERATION RANGE | WHOLE IMAGE | PARTIAL IMAGE | WHOLE IMAGE | TOTAL |
| IMAGE AREA (RELATIVE VALUE) | 5 × 5 | 1 × 1 | 5 × 5 | - |
| NUMBER OF PIXELS PER UNIT AREA (RELATIVE VALUE) | 4 × 4 | 4 × 4 | 1 × 1 | - |
| AMOUNT OF DATA (RELATIVE VALUE) | <u>400</u> | 16 | 25 | <u>41</u> |

IMAGING APPARATUS, DEPTH MAP GENERATION METHOD, AND PROGRAM

CROSS REFERENCES TO RELATED APPLICATIONS

The present application claims priority to Japanese Patent Application No. 2023-176071 filed on Oct. 11, 2023, the disclosure of which is incorporated herein by reference.

TECHNICAL FIELD

The present invention relates to an imaging apparatus, a depth map generation method, and a program.

BACKGROUND

In the field of coded imaging, a technique called depth from defocus (DFD) has been known. The DFD technique is a technique for estimating a distance from an imaging system or an optical system of an imaging apparatus to a subject, that is, a depth of the subject based on a degree of blurring of an edge appearing in an image obtained by imaging.

The DFD technique is described in, for example, International Publication No. WO2011/158508 (Patent Document 1) and "Coded Aperture Pairs for Depth from Defocus and Defocus Deblurring" C. Zhou, S. Lin and S. K. Nayar, International Journal of Computer Vision, Vol. 93, No. 1, pp. 53, May. 2011 (Non-Patent Document 1). In the DFD technique described in Non-Patent Document 1, a mask called a coded aperture in which a geometric pattern of an aperture through which light passes is known in advance is prepared. Then, coded imaging is performed to capture an image of a subject by arranging the prepared mask in a light incident region of an optical system. Next, the captured image obtained by the coded imaging is subjected to a decoding process based on a point spread function unique to the used mask, whereby a depth of the subject is estimated. Note that the point spread function is generally abbreviated to PSF, and is also called a blur function, a blur spread function, a point image distribution function, or the like.

SUMMARY

The DFD technique is still in development, and the DFD technique has room for improvement in practicality. Due to the above circumstances, a more practical DFD technique is desired.

Outlines of typical embodiments of the invention disclosed in the present application will be described as follows.

A typical embodiment of the invention disclosed in the present application is an imaging apparatus including a coded imaging system and an arithmetic control unit, and the arithmetic control unit is configured to execute: an imaging process of controlling the coded imaging system to capture an image of a subject by coded imaging and obtain a first captured image; an image generation process of reducing resolution of the first captured image to obtain a second captured image; a partial region setting process of setting a partial region in the first captured image; a process of performing a first decoding process on a partial image corresponding to the partial region in the first captured image to obtain a first depth map; and a process of performing a second decoding process on the second captured image to obtain a second depth map.

Another typical embodiment of the invention disclosed in the present application is a depth map generation method that executes: an imaging process of capturing an image of a subject by coded imaging using a coded imaging system to obtain a first captured image; an image generation process of reducing resolution of the first captured image to obtain a second captured image; a partial region setting process of setting a partial region in the first captured i image; a process of performing a first decoding process on a partial image corresponding to the partial region in the first captured image to obtain a first depth map; and a process of performing a second decoding process on the second captured image to obtain a second depth map.

Another typical embodiment of the invention disclosed in the present application is a program for causing a computer to execute: an imaging process of capturing an image of a subject by coded imaging using a coded imaging system to obtain a first captured image; an image generation process of reducing resolution of the first captured image to obtain a second captured image; a partial region setting process of setting a partial region in the first captured j a process of performing a first decoding process on a partial image corresponding to the partial region in the first captured image to obtain a first depth map; and a process of performing a second decoding process on the second captured image to obtain a second depth map.

BRIEF DESCRIPTION OF DRAWINGS

FIG. 9 is a view illustrating an example of a captured image used for a decoding process in a method according to the first embodiment;

FIG. 10 is a diagram illustrating an example of an environment in executing a decoding operation and an estimated value of the amount of operations in a case where a decoding process is performed by the method according to the first embodiment;

FIG. 11 is a diagram in which the estimated value of the amount of operations in the reference method and the estimated value of the amount of operations in the method according to the present embodiment are described side by side; and FIG. 12 is a diagram in which an estimated value of a data amount of a depth map obtained by the reference method and an estimated value of a data amount of a depth map obtained by the method according to the present embodiment are described side by side.

DETAILED DESCRIPTION OF THE INVENTION

Figure 1:
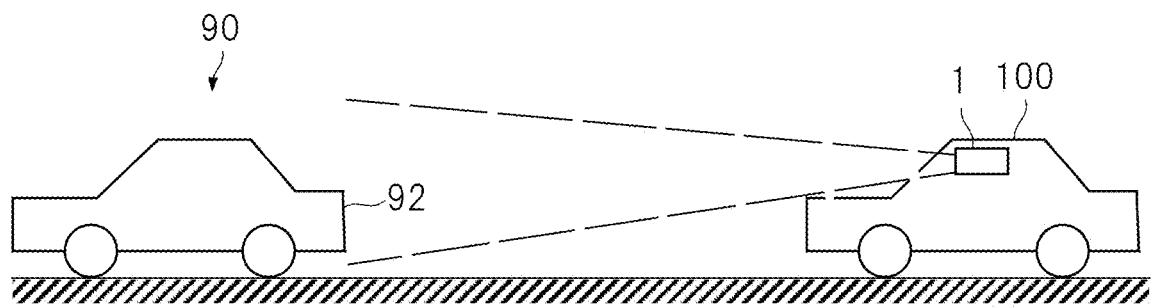
FIG. 1 is a diagram illustrating an installation example of an imaging apparatus according to a first embodiment.

Prior to describing each embodiment of the invention of the present application, one of specific problems in the DFD technique found by the present inventors will be described.

A blur aspect of a subject in a captured image generally depends on a point spread function determined by an optical system of an imaging apparatus, a shape of a light incident region of the optical system, and the like. In a case where a mask that partially shields light is installed in the light incident region of the optical system, the point spread function is determined for each mask. Imaging of the subject with the imaging apparatus in which the mask is installed is called coded imaging. When the image of the subject is captured by the coded imaging, a blurred image is acquired based on the point spread function unique to the used mask.

When a decoding process of performing deconvolution based on the point spread function unique to the used mask is performed on the blurred image, a decoded image with improved or suppressed blurring and depth information of an object corresponding to each position of the decoded image are obtained.

Meanwhile, as a result of studying the DFD technique based on the coded imaging using the mask, the present inventors have recognized that a large amount of operations is required for the decoding process and operation time becomes relatively long if sufficient accuracy is to be secured in depth estimation of the subject. That is, the present inventors have found that there is a need of reducing the amount of operations required for the decoding process to shorten the operation time while securing necessary estimation accuracy in a case where the depth of the subject is estimated by performing the decoding process on the captured image obtained by the coded imaging.

The present inventors have devised the invention of the present application in order to solve the above problem. Hereinafter, embodiments of the invention of the present application will be described. Note that the embodiments described below are examples for carrying out the invention of the present application, and do not limit the technical scope of the invention of the present application. In the following embodiments, constituent elements having the same function will be denoted by the same reference signs, and the repeated description thereof will be omitted unless particularly necessary.

First Embodiment

<Outline of Imaging Apparatus According to First Embodiment>

An imaging apparatus according to a first embodiment of the present application will be described. An imaging apparatus according to the first embodiment of the present application includes a coded imaging system and an arithmetic control unit. In the imaging apparatus, the arithmetic control unit executes: an imaging process of controlling the coded imaging system to capture an image of a subject by coded imaging and obtain a first captured image; an image generation process of reducing resolution of the first captured image to obtain a second captured image; a partial region setting process of setting a partial region in the first captured image; a process of performing a first decoding process on a partial image corresponding to the partial region in the first captured image to obtain a first depth map; and a process of performing a second decoding process on the second captured image to obtain a second depth map.

That is, the imaging apparatus according to the first embodiment is characterized in that a decoding process with high accuracy and a large amount of operations is performed on a partial region considered to be highly important in the entire image region of a captured image in depth estimation of the entire subject based on coded imaging. Further, the imaging apparatus is characterized in that a decoding process with low accuracy and a small amount of operations is performed on the other regions except for the partial region in the entire image region of the captured image so as to reduce the overall amount of operations while securing necessary accuracy as a whole, and to increase the speed of the decoding process or data transfer.

<Installation Example and Configuration Example of Imaging Apparatus>

FIG. 1 is a diagram illustrating an installation example of the imaging apparatus according to the first embodiment. In the first embodiment, an imaging apparatus 1 is installed in an automobile 100 which is an example of transportation as illustrated in FIG. 1. The imaging apparatus 1 is installed to capture an image of a subject 90 in front of the automobile 100 by coded imaging. The subject 90 includes a preceding vehicle 92 which is a vehicle traveling in front of the automobile 100.

Figure 2:
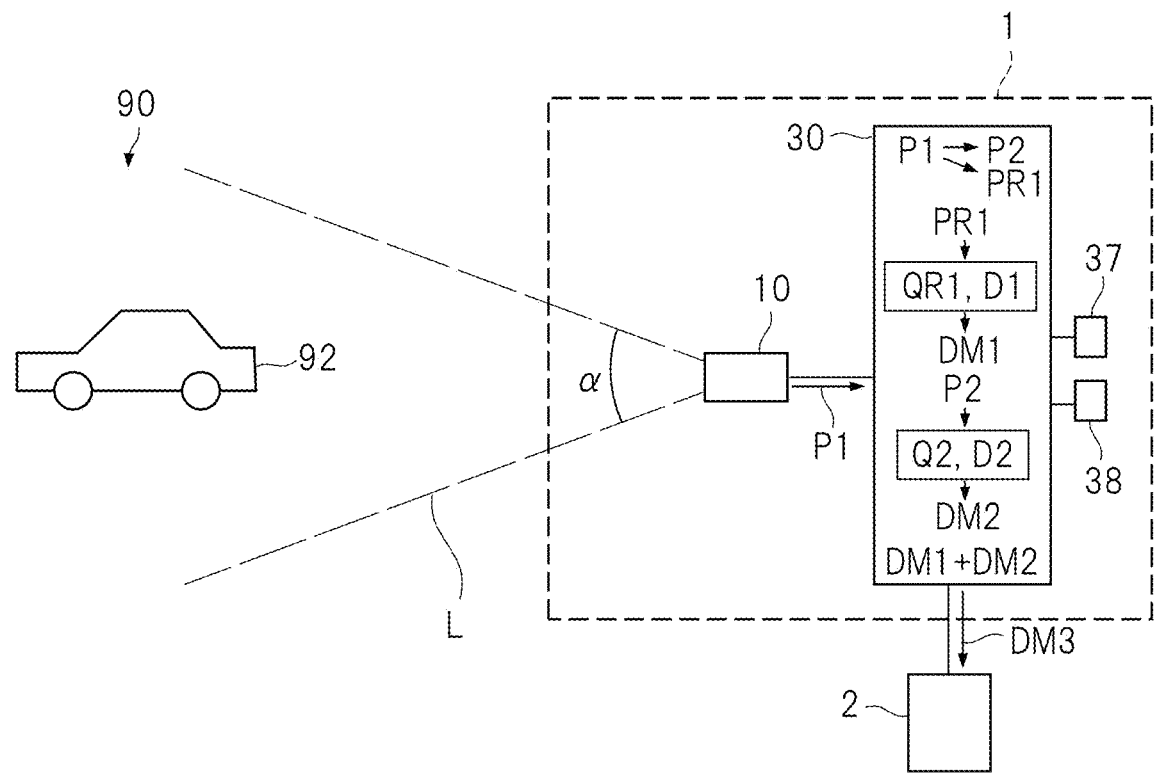
FIG. 2 is a diagram illustrating an example of a configuration of the imaging apparatus.

FIG. 2 is a diagram illustrating an example of a configuration of the imaging apparatus 1. As illustrated in FIG. 2, the imaging apparatus 1 includes a coded imaging system 10, an arithmetic control unit 30, an operation unit 37, and a display unit 38. Each of the coded imaging system 10, the operation unit 37, and the display unit 38 is connected to the arithmetic control unit 30.

The coded imaging system 10 is an imaging system having an angle of view α, captures the image of the subject 90 by coded imaging based on a control signal from the arithmetic control unit 30, and transmits information of a high-resolution whole captured image P1 that is the obtained captured image to the arithmetic control unit 30. The high-resolution whole captured image P1 means a captured image representing the whole image whose resolution is not reduced.

The arithmetic control unit 30 reduces the resolution of the high-resolution whole captured image P1 to generate a low-resolution whole captured image P2. The low-resolution whole captured image P2 means a captured image representing the whole image with the reduced resolution. The arithmetic control unit 30 specifies a high-resolution partial captured image PR1 corresponding to a set partial region R1 in an image region of the high-resolution whole captured image P1. The partial region R1 is, for example, a region in which depth estimation of the subject is highly likely to be obtained with high accuracy in the high-resolution whole captured image P1.

The arithmetic control unit 30 performs the first decoding process on the high-resolution partial captured image PR1 to obtain a high-accuracy partial decoded image QR1 in which blurring is suppressed and a depth estimation value (depth) D1 of the subject at each position of the high-accuracy partial decoded image QR1, and generates a partial depth map DM1 based on the high-accuracy partial decoded image QR1 and the depth estimation value D1. Furthermore, the arithmetic control unit 30 performs the second decoding process on the low-resolution whole captured image P2 to obtain a low-accuracy whole decoded image Q2 in which blurring is suppressed and a depth estimation value (depth)

D2 of the subject at each position of the low-accuracy whole decoded image Q2, and generates a whole depth map DM2 based on the low-accuracy whole decoded image Q2 and the depth estimation value D2.

The arithmetic control unit 30 generates a combined depth map DM3 by superimposing and combining the partial depth map DM1 on the whole depth map DM2, and outputs the combined depth map DM3 to an external device 2.

Note that the arithmetic control unit 30 receives an input of information related to a command, designation, and the like based on an operation of the operation unit 37 by a user. Furthermore, the arithmetic control unit 30 causes the display unit 38 to display information directed to the user. The operation unit 37 may be, for example, a mouse, a key, a button, a dial, or the like. The display unit 38 may be, for example, a liquid crystal panel, an organic EL panel, or the like. The operation unit 37 and the display unit 38 may be integrally configured, and may be, for example, a touch panel.

Here, the coded imaging system 10 is an example of the "coded imaging system" in the present application. The arithmetic control unit 30 is an example of the "arithmetic control unit" in the present application. The high-resolution whole captured image P1 is an example of the "first captured image" in the present application. The high-resolution partial captured image PR1 is an example of the "partial image" in the present application. The low-resolution whole captured image P2 is an example of the "second captured image" in the present application.

A configuration of the coded imaging system 10 will be described in more detail hereinafter.

Figure 3:
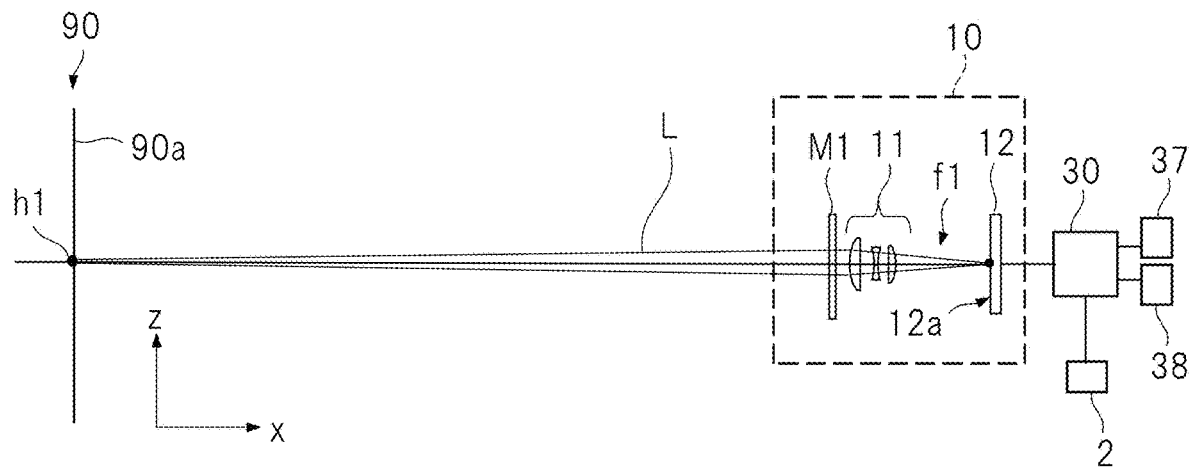
FIG. 3 is a diagram illustrating an example of a configuration of a coded imaging system.

FIG. 3 is a diagram illustrating an example of the configuration of the coded imaging system 10. As illustrated in FIG. 3, the coded imaging system 10 includes an optical system 11, an imaging element 12, and a mask M1.

The optical system 11 is, for example, a wide-angle lens having a relatively wide angle of view. The optical system 11 collects light L coming from the subject 90 and forms an image on a light receiving surface 12a of the imaging element 12.

The mask M1 is an optical filter that allows part of the light L entering the optical system 11 to pass therethrough and shields the other part of the light L. The mask M1 is installed in a light incident region where the light L enters the optical system 11 from the subject 90. The mask M1 is installed, for example, on the side of the subject 90 of the optical system 11. The mask M1 may be installed in the optical system 11. Note that the "mask" is also referred to as a "coded aperture", a "coded opening", an "aperture", or the like.

The imaging element 12 is an electronic component that performs photoelectric conversion, and includes a large number of two-dimensionally arranged photoelectric conversion elements. The large number of photoelectric conversion elements form the light receiving surface 12a. The imaging element 12 performs photoelectric conversion to convert light and shade due to light of the image formed on the light receiving surface 12a into an amount of electric charge. When imaging, which is a process of instantaneously capturing an electric signal obtained by the photoelectric conversion, is performed, the imaging element 12 obtains and outputs data of the high-resolution whole captured image P1 representing the subject 90. The imaging is performed by, for example, a rolling shutter method or a global shutter method.

The "imaging element" is also referred to as an "image sensor". The imaging element 12 is, for example, a charge coupled device (CCD) image sensor, a complementary metal oxide semiconductor (CMOS) image sensor, or the like.

The light L coming from a point image h1 on a surface 90a of the subject 90 passes through the mask M1 as the coded aperture and enters the optical system 11, and the light L passing through the optical system 11 forms a blurred image on the light receiving surface 12a of the imaging element 12. In this blurred image, the point image h1 is coded by a point spread function f1 unique to the coded imaging system 10 including the mask M1.

Figure 4:
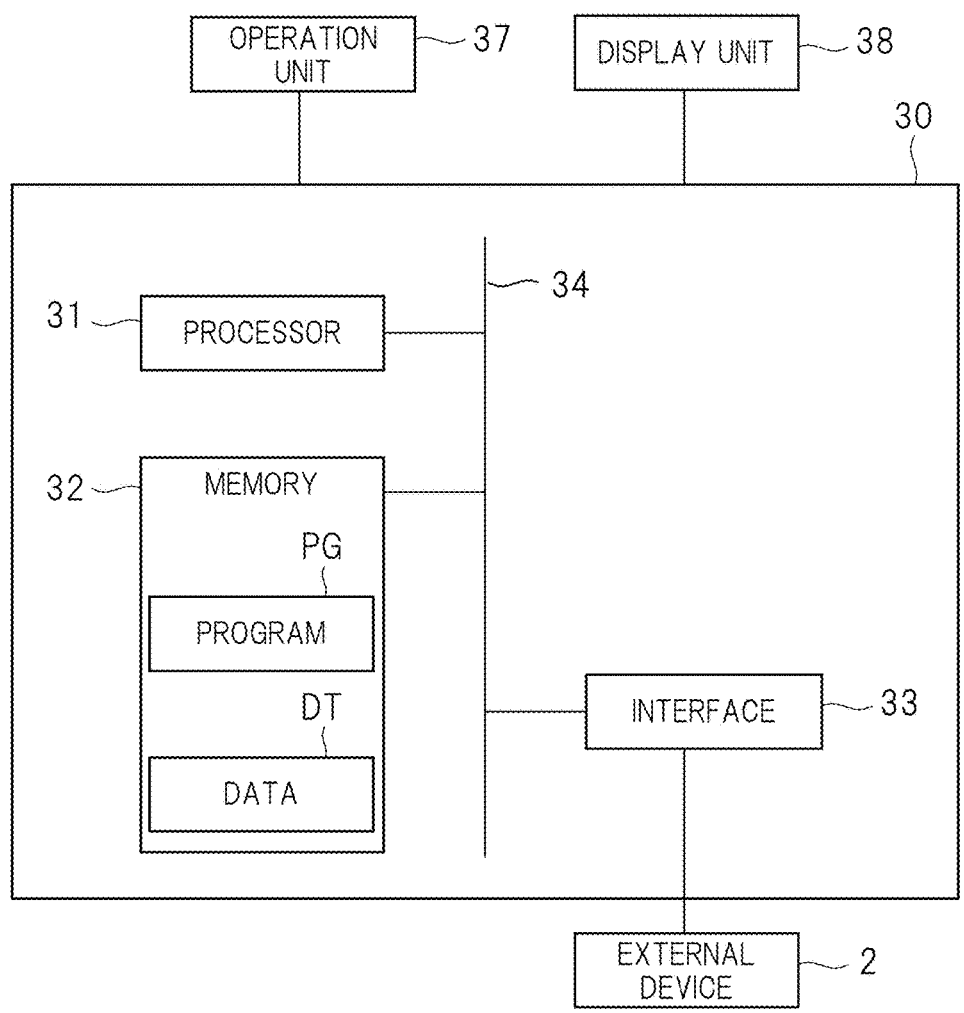
FIG. 4 is a diagram illustrating an example of a hardware configuration of an arithmetic control unit.

A configuration of the arithmetic control unit 30 will be described. FIG. 4 is a diagram illustrating an example of a hardware configuration of the arithmetic control unit 30. The arithmetic control unit 30 is, for example, a computer, and includes a processor 31, a memory 32, an interface 33, and a communication bus 34 as illustrated in FIG. 4. The processor 31, the memory 32, and the interface 33 are connected to each other via the communication bus 34, and transmit and receive data.

The processor 31 is, for example, a central processing unit (CPU), a micro-processing unit (MPU), a microcontroller, a graphics processing unit (GPU), or the like.

The memory 32 is, for example, a semiconductor storage device, and may include a magnetic disk, an optical disk, and the like. The memory 32 stores a program PG and stores various types of data DT. The processor 31 functions to perform various processes by reading and executing the program PG.

The interface 33 is connected to the processor 31, the external device 2, and the like, and mediates transmission and reception of signals or data between these devices.

In a case where the arithmetic control unit 30 is a computer, all or a part of the computer may be configured by a semiconductor circuit such as a digital signal processor (DSP), an application specific integrated circuit (ASIC), a field programmable gate array (FPGA), or a complex programmable logic device (CPLD). Furthermore, the arithmetic control unit 30 may include an electronic circuit such as an image processing engine that processes data output from the imaging element 12.

<Functional Block Configuration of Arithmetic Control Unit>

A functional block configuration of the arithmetic control unit 30 will be described. Each of functional blocks constituting the arithmetic control unit 30 is realized by the processor 31 reading and executing the program PG stored in the memory 32.

Figure 5:
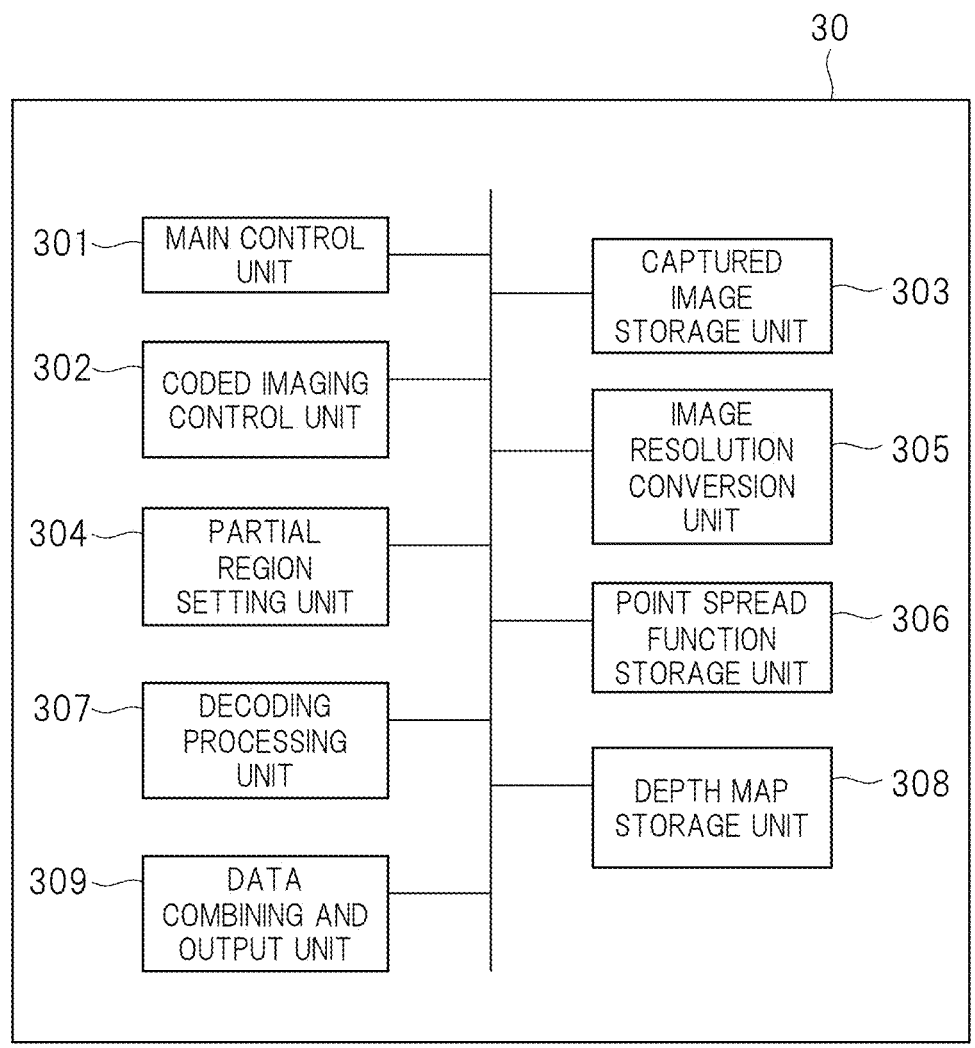
FIG. 5 is a diagram illustrating an example of a functional block configuration of the arithmetic control unit.

FIG. 5 is a diagram illustrating an example of the functional block configuration of the arithmetic control unit 30. As illustrated in FIG. 5, the arithmetic control unit 30 includes, as the functional blocks, a main control unit 301, a coded imaging control unit 302, a captured image storage unit 303, a partial region setting unit 304, an image resolution conversion unit 305, a point spread function storage unit 306, a decoding processing unit 307, a depth map storage unit 308, and a data combining and output unit 309.

The main control unit 301 controls each unit such that each step from coded imaging to depth map output is performed, performs various settings or controls execution processing steps.

The coded imaging control unit 302 controls the coded imaging system 10 such that the coded imaging of the subject 90 is performed. When the coded imaging is performed, the high-resolution whole captured image P1 having resolution substantially equivalent to the resolution of the imaging element 12 is obtained and sent to the captured image storage unit 303.

The captured image storage unit 303 stores the high-resolution whole captured image P1 that is the captured image obtained by the coded imaging. Furthermore, the captured image storage unit 303 also stores the low-resolution whole captured image P2 obtained by reducing the resolution of the high-resolution whole captured image P1 using the image resolution conversion unit 305.

The partial region setting unit 304 sets the partial region R1 in the high-resolution whole captured image P1. For example, the partial region R1 is set to a region for which a depth map with high accuracy, that is, spatially or temporally high resolving power is highly likely to be required by the external device 2 that uses the depth map output from the imaging apparatus 1.

The external device 2 is, for example, a device that assists driving of transportation such as an automobile. In this case, a region in the vicinity of the center of the captured image is often regarded as important. This is because that the vicinity of the center of the captured image is highly likely to be a place where the transportation where the imaging apparatus 1 is installed is to travel and pass in the future, and there is a constant need to estimate a depth of a preceding transportation or an obstacle with high accuracy. Therefore, the partial region R1 is set at the center of the high-resolution whole captured image P1 in the present embodiment.

Note that the partial region R1 may be set at a position designated by the user or may be set based on an analysis result of the high-resolution whole captured image P1. For example, in a case where positions of objects such as a preceding transportation, a bicycle, a pedestrian, and a signal are identified by the analysis result of the high-resolution whole captured image P1, the partial region R1 may be set at the positions of these identified objects. Furthermore, a plurality of the partial regions R1 may be provided. Furthermore, the partial region R1 is assumed to be a region having a rectangular shape, but may be a region having a perfect circular shape, an elliptical shape, or a polygonal shape.

The image resolution conversion unit 305 reduces the resolution of the high-resolution whole captured image P1 obtained by the coded imaging, by resolution conversion to obtain the low-resolution whole captured image P2. The obtained low-resolution whole captured image P2 is sent to the captured image storage unit 303.

The point spread function storage unit 306 stores a plurality of types of point spread functions f1, . . . , and fj used in the first decoding process and the second decoding process. The point spread function f is a function that defines what kind of blur aspect B is caused on the light receiving surface 12a of the imaging element 12 by the point image h1 of the subject 90 at a position of a distance d from the coded imaging system 10 when the coded imaging is performed using the mask M1 as the coded aperture. That is, the point spread function f can be said to be a function that uses the distance d as a parameter.

It is assumed that a point image hz of a subject at a position of a distance dz is captured by coded imaging using the mask M1, the optical system 11, and the imaging element 12 to obtain a captured image Pz. When the captured image Pz is decoded using a point spread function fz having the distance dz as a parameter, a decoded image Qz without blurring is obtained, and it can be estimated that the distance of the subject is dz.

That is, when decoding using the plurality of types of point spread functions f having mutually different distances d as parameters is performed on a captured image in which a distance d to the subject 90 is unknown to search for the point spread function f in a case where blurring is most improved, the distance d as the parameter of the searched point spread function f can be estimated as the distance, that is, depth of the subject 90. Furthermore, as the decoding process is executed using more types of point spread functions f having different distances d as parameters, it is possible to estimate the depth of the subject 90 with higher resolving power and higher accuracy.

The decoding processing unit 307 performs the first decoding process on the high-resolution partial captured image PR1 and the second decoding process on the low-resolution whole captured image P2 based on the various settings performed in advance. The first decoding process is a decoding process using a relatively large first number n of types of point spread functions fa1, . . . , and fan, and is referred to as a high-accuracy partial decoding process here. Furthermore, the second decoding process is a decoding process using a relatively small second number m of types of point spread functions fb1, . . . , and fbm (m<n), and is referred to as a low-accuracy whole decoding process here.

The decoding processing unit 307 executes the high-accuracy partial decoding process, which is the first decoding process, on the high-resolution partial captured image PR1 to obtain the high-accuracy partial decoded image QR1 with a high degree of suppression of blurring and the depth estimation value D1 of the subject 90 with high accuracy in the high-accuracy partial decoded image QR1. The decoding processing unit 307 further generates a highly accurate partial depth map DM1 from the high-accuracy partial decoded image QR1 and the highly accurate depth estimation value D1 of the subject.

Furthermore, the decoding processing unit 307 executes the low-accuracy whole decoding process, which is the second decoding process, on the low-resolution whole captured image P2 to obtain the low-accuracy whole decoded image Q2 with a low degree of suppression of blurring and the depth estimation value D2 of the subject 90 with low accuracy in the low-accuracy whole decoded image Q2. The decoding processing unit 307 further generates the whole depth map DM2 having low accuracy from the low-accuracy whole decoded image Q2 and the low-accuracy depth estimation value D2 of the subject.

Note that the decoding processing unit 307 may perform the high-accuracy partial decoding process, which is the first decoding process, at a relatively high first frequency, and perform the low-accuracy whole decoding process, which is the second decoding process, at a relatively low second frequency. The first frequency is basically the same as a frequency at which the coded imaging is performed, but is not limited thereto.

The depth map storage unit 308 stores depth maps generated by the decoding processing unit 307. In the present embodiment, the depth map storage unit 308 stores the partial depth map DM1 having high accuracy and the whole depth map DM2 having low accuracy.

The data combining and output unit 309 combines the depth maps stored in the depth map storage unit 308 to obtain a combined depth map, and outputs the combined depth map to the outside. More specifically, the data combining and output unit 309 generates and outputs a combined depth map DM3 in which only the partial region R1 has high accuracy and the other portion has low accuracy by superimposing and combining the highly accurate partial depth map DM1 on the low-accuracy whole depth map DM2. The combined depth map DM3 is generated every time the coded imaging, that is, the high-accuracy partial decoding process is performed.

However, in a case where the low-accuracy whole decoding process, which is the second decoding process, is not executed every time the coded imaging, that is, the high-accuracy partial decoding process is performed, the data combining and output unit 309 combines the low-accuracy whole depth map DM2 obtained most recently with the highly accurate partial depth map DM1 obtained most recently to generate the combined depth map DM3.

Alternatively, in a case where the low-accuracy whole decoding process and the high-accuracy partial decoding process are not performed at the same timing of coded imaging, the data combining and output unit 309 may output only the partial depth map DM1 with high accuracy obtained by the high-accuracy partial decoding process.

Note that the partial depth map DM1 is an example of the "first depth map" in the present application, the whole depth map DM2 is an example of the "second depth map" in the present application, and the combined depth map DM3 is an example of a "third depth map" in the present application.

<Decoding Process and Point Spread Function>

Here, a decoding process performed in the present embodiment and a point spread function used in the decoding process will be described in more detail.

First, the relationship between the point spread function and the decoding process will be described. As described above, the light L from the point image h1 of the subject 90 at a position separated from the coded imaging system 10 by a distance d1 passes through the optical system 11 through the mask M1, which is the coded aperture, and is formed on the light receiving surface 12a of the imaging element 12. In this case, a state is assumed in which light L from a point image h2 at a position separated from the coded imaging system 10 by a distance d2 passes through the mask M1 and the optical system 11 and appears as a blurred image in a blur aspect B2 on the light receiving surface 12a.

If there is no change in states and positional relationship of the mask M1, the optical system 11, and the light receiving surface 12a, a point spread function of a system in which a point separated by the distance d2 becomes the blurred image in the blur aspect B2 on the light receiving surface 12a is defined as, for example, f2. It is assumed that there is a captured image Ps obtained by coded imaging of a point image hs of a subject whose distance d from the coded imaging system 10 is unknown using the same system. If an image Qs without blurring is obtained in a case where the decoding operation is performed on the captured image Ps using the point spread function f2, it can be seen that the point image hs is at the position separated from the coded imaging system 10 by the distance d2.

That is, a decoding operation is repeatedly performed by applying a plurality of point spread functions fk having different distances d as parameters to a blurred image centered on each position x in a captured image in order to obtain a depth map from the captured image obtained by coded imaging. Then, the distance d as the parameter of the point spread function fz when an image with the least blur is obtained can be estimated as a distance of a subject corresponding to the position x from the coded imaging system 10, that is, a depth of the subject.

Therefore, in the present embodiment, the decoding process is a process of repeatedly performing decoding operations by applying a plurality of types of point spread functions fk having different distances d as parameters to a plurality of positions in a captured image obtained by coded imaging and estimating the distance dz, which is the parameter of the point spread function fz applied when the image with the least blur is obtained, as a distance (depth) of a subject of an image at the position.

Next, the decoding process will be described. In the present embodiment, two types of decoding processes, that is, the high-accuracy partial decoding process as the first decoding process and the low-accuracy whole decoding process as the second decoding process are executed as described above. The first decoding process is performed with relatively high accuracy on the high-resolution partial captured image PR1 corresponding to the set partial region R1 in the high-resolution whole captured image P1 obtained by coded imaging. The second decoding process is performed with relatively low accuracy on the low-resolution whole captured image P2 obtained by reducing the resolution of the high-resolution whole captured image P1 obtained by the coded imaging.

The high-accuracy partial decoding process, which is the first decoding process, is basically executed every time coded imaging is performed. On the other hand, the low-accuracy whole decoding process, which is the second decoding process, is not necessarily executed every time the coded imaging is performed, and may be performed at a rate of once for every certain (two or more) times of coded imaging. That is, in the low-accuracy whole decoding process, an execution cycle may be lengthened to lower temporal resolving power as compared with the high-accuracy partial decoding process. Furthermore, in the low-accuracy whole decoding process, the number of types of point spread functions applied to the decoding operation may be reduced as compared with that in the high-accuracy partial decoding process so as to more roughly estimate the depth of the image of the subject. That is, in the low-accuracy whole decoding process, the resolving power of the depth of the subject to be estimated may be lowered as compared with the high-accuracy partial decoding process.

In a case where decoding processes on an image having the same area are considered, the amount of operations decreases and the amount of data obtained as a result also decreases in the decoding process with low accuracy as compared with the decoding process with high accuracy. Therefore, the decoding process is performed with low accuracy in the entire region including a region where decoding with high accuracy is not required in a captured image. On the other hand, a region where decoding with high accuracy is required in the captured image is set as a partial region, and the decoding process is performed with high accuracy on the partial region. In this manner, it is possible to reduce the amount of operations and the amount of data transfer while securing the accuracy required as a whole as information obtained by decoding, and it is possible to suppress the time required for the operations and the data transfer.

Based on the content of the decoding process described above, the main control unit 301 sets the partial region to be subjected to the decoding process with high accuracy in the image region of the captured image, the resolution of the low-resolution whole captured image, the execution cycle (execution frequency) of the low-resolution whole decoding process, a type of the point spread function applied to the low-resolution whole decoding process, a type of the point spread function applied to the high-resolution partial decoding process, and the like.

<Processing Flow of Imaging Apparatus>

Figure 6:
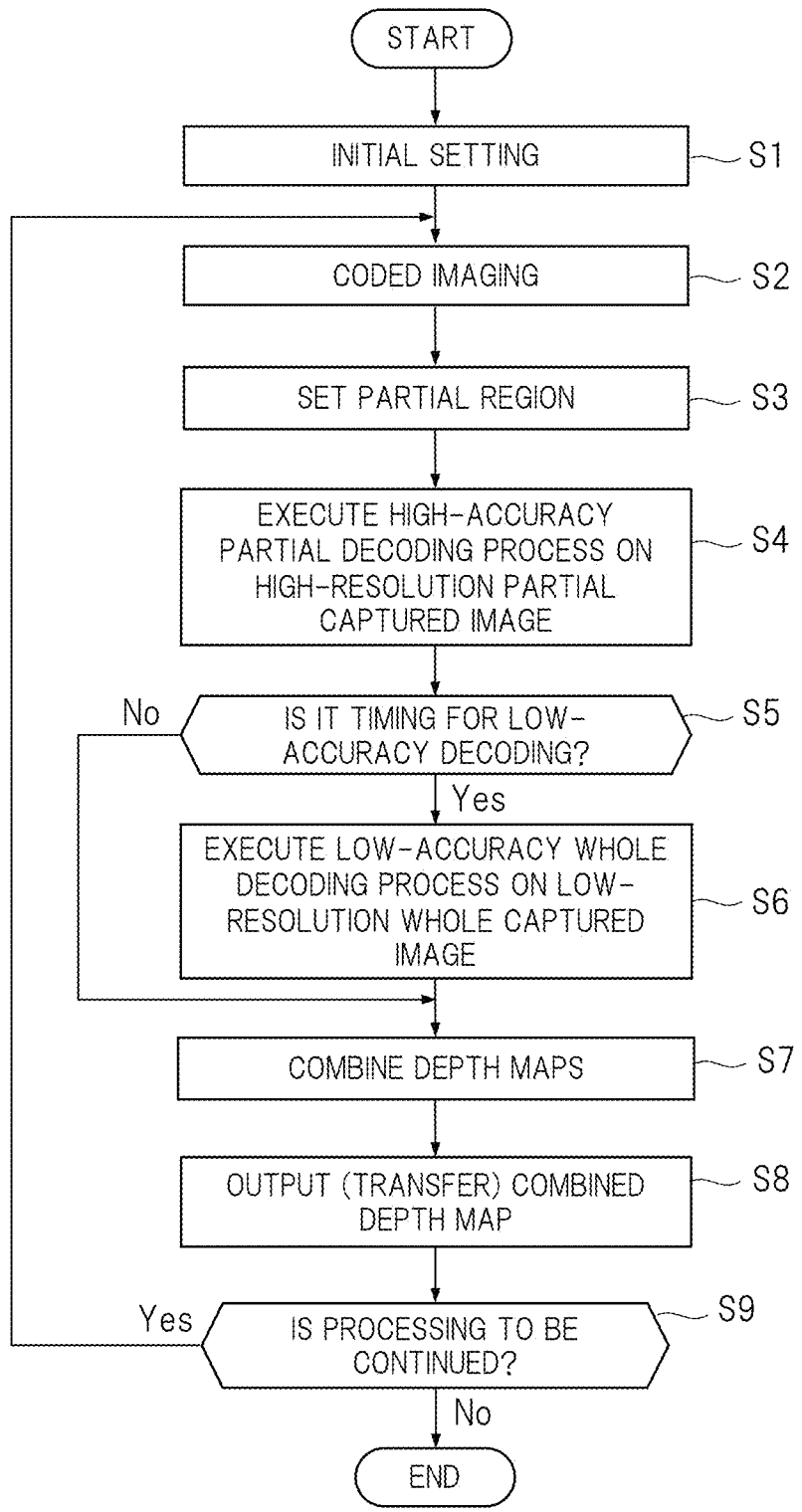
FIG. 6 is a diagram illustrating an example of a processing flow in the imaging apparatus according to the first embodiment.

Hereinafter, a processing flow in the imaging apparatus according to the first embodiment will be described. FIG. 6 is a diagram illustrating an example of the processing flow in the imaging apparatus 1 according to the first embodiment. The processing flow in the imaging apparatus 1 includes processes of steps S1 to S9, for example, as illustrated in FIG. 6.

In step S1, an initial setting is performed. Specifically, the main control unit 301 sets how much the resolution is to be reduced to generate the low-resolution whole captured image P2 from the high-resolution whole captured image P1. Here, as an example, a setting is made such that a pixel region of 4×4 in the high-resolution whole captured image P1 corresponds to one pixel. A pixel value after the resolution reduction is a representative pixel value in the corresponding pixel region of 4×4, and is, for example, an average value, a median value, a weighted average value, or the like of pixel values.

Furthermore, the main control unit 301 sets a repetition cycle of the low-resolution whole decoding process as the second decoding process, that is, any rate of the low-resolution whole decoding process to be executed once for any number of times of coded imaging. Here, as an example, the low-resolution whole decoding process is set to be executed once for four times of coded imaging. The high-resolution partial decoding process is set to be executed every time coded imaging is performed.

Furthermore, the main control unit 301 sets the number of types of point spread functions to be applied for each of the high-resolution partial decoding process as the first decoding process and the low-resolution whole decoding process as the second decoding process. Here, as an example, twenty five types of point spread functions are used in the high-resolution partial decoding process, and five types of point spread functions are used in the low-resolution whole decoding process.

The twenty five types of point spread functions used in the high-resolution partial decoding process are, for example, point spread functions made up of combinations of the distances d as the parameters including ten types of 1 m to 10 m in increments of 1 m, ten types of 12 m to 30 m in increments of 2 m, and five types of 35 m to 55 m in increments of 5 m. Furthermore, the five types of point spread functions used in the low-resolution whole decoding process are, for example, point spread functions in which distances d as parameters are 5 m, 10 m, 20 m, 35 m, and 50 m, respectively.

Note that the above initial setting may be automatically performed based on information determined in advance, or may be performed based on any information input by the user via the operation unit 37.

In step S2, coded imaging is performed. Specifically, the coded imaging control unit 302 controls the coded imaging system 10 such that the coded imaging is performed. The high-resolution whole captured image P1 obtained by the coded imaging is stored in the captured image storage unit 303.

In step S3, the partial region R1 is set. Specifically, the main control unit 301 sets the partial region R1 in a part of an image region of the high-resolution whole captured image P1 where highly accurate subject depth estimation is considered to be required. Here, as an example, the partial region R1 is set at the center of the whole image region.

In step S4, the high-accuracy partial decoding process as the first decoding process is performed. Specifically, the decoding processing unit 307 performs a decoding operation on the high-resolution partial captured image PR1 corresponding to the partial region R1 in the high-resolution whole captured image P1 using a relatively large number of types of point spread functions fa1, . . . , and fan determined in the initial setting. As such a high-accuracy partial decoding process is executed, the highly accurate partial depth map DM1 is finally obtained. The obtained partial depth map DM1 is stored in the depth map storage unit 308.

In step S5, it is determined whether or not it is a timing for execution of the low-accuracy whole decoding process as the second decoding process. Specifically, the main control unit 301 determines whether or not to perform the low-accuracy whole decoding process at a timing of current coded imaging based on an execution cycle set in step S1. In a case where it is determined to perform the low-accuracy whole decoding process (S5: Yes), the main control unit 301 advances a processing step to the next step S6. On the other hand, in a case where it is determined not to perform the low-accuracy whole decoding process, the processing step is skipped to step S7.

In step S6, the low-accuracy whole decoding process as the second decoding process is performed. Specifically, the image resolution conversion unit 305 reduces resolution of the high-resolution whole captured image P1 according to the initial setting to generate the low-resolution whole captured image P2. Then, the decoding processing unit 307 performs a decoding operation on the generated low-resolution whole captured image P2 using a relatively small number of types of point spread functions fb1, . . . , and fbm (n>m≥1) determined by the initial setting. As such a low-accuracy whole decoding process is the low-accuracy whole depth map DM2 is finally executed, obtained. The obtained whole depth map DM2 is stored in the depth map storage unit 308.

In step S7, depth maps are combined. Specifically, the data combining and output unit 309 reads the most recently obtained partial depth map DM1 and whole depth map DM2 stored in the depth map storage unit 308, and superimposes and combines the partial depth map DM1 on the whole depth map DM2 to obtain the combined depth map DM3. The obtained combined depth map DM3 is stored in the depth map storage unit 308.

In step S8, the combined depth map DM3 is output. Specifically, the data combining and output unit 309 reads the most recently obtained combined depth map DM3 from the depth map storage unit 308, and outputs the combined depth map DM3 to the external device 2.

In step S9, it is determined whether or not to continue the processing. Specifically, the main control unit 301 detects whether or not an event for which processing should not be continued has occurred. For example, it is detected whether an error has occurred in the imaging apparatus 1, whether the user has input a forced stop command, or the like. In a case where such an event for which the processing should not be continued has not occurred, the main control unit 301 determines to continue the processing (S9: Yes), and returns the processing step to step S2. On the other hand, in a case where such an event has occurred, the main control unit 301 determines not to continue the processing (S9: No) and ends the processing.

Although the example of the processing flow in the imaging apparatus 1 has been described above, the order of each processing step in the processing flow is not limited to this example, and for example, the process of step S4 and the processes of steps S5 and S6 may be interchanged.

<Amount of Operations and Amount of Data Transfer Required for Decoding Process>

Here, the amount of operations required for a decoding process and a data amount of an obtained depth map will be estimated for each of a reference method considered to be general in the DFD technique and a method according to the present embodiment and compared with each other.

Figures 7, 8:
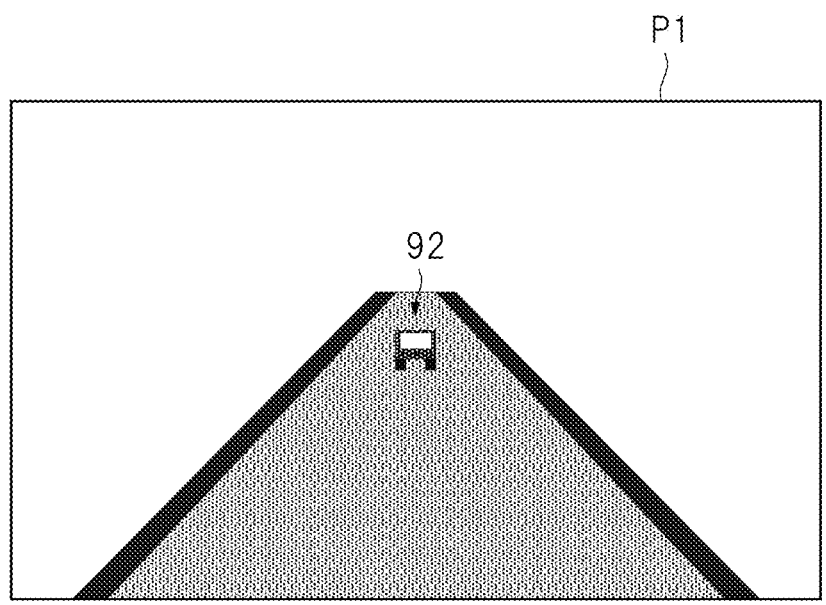
FIG. 7 is a view illustrating an example of a captured image used in a decoding process in a reference method.
FIG. 8 is a diagram illustrating an example of an environment in executing a decoding operation and an estimated value of the amount of operations in a case where the decoding process is performed by the reference method.

FIG. 7 is a view illustrating an example of a captured image used for a decoding process in the reference method. Furthermore, FIG. 8 is a diagram illustrating an example of an environment in executing a decoding operation and an estimated value of the amount of operations in a case where the decoding process is performed by the reference method.

When coded imaging is performed by the imaging apparatus 1 installed in the automobile 100, for example, the high-resolution whole captured image P1 in which the preceding vehicle 92 is located near the center is directly obtained as illustrated in FIG. 7.

In a case where the decoding process is performed on the high-resolution whole captured image P1 by the reference method that is considered to be general, for example, it is possible to consider the environment in executing the decoding operation and the estimated value of the amount of operations as illustrated in FIG. 8. As illustrated in FIG. 8, for example, an operation range is a whole image, an image area is 5×5 (relative value), the number of pixels per unit area is 4×4 (relative value), the number of types of point spread functions used in one operation of the decoding process is twenty five, and the number of times of the decoding process executed per unit time is 60. When the decoding process is executed in such an environment, the amount of operations required for the decoding process per unit time can be expressed as a value obtained by multiplying all these numbers, and is 600,000 (relative value) in this example.

FIG. 9 is a view illustrating an example of a captured image used for the decoding process in the method according to the first embodiment. Furthermore, FIG. 10 is a diagram illustrating an example of an environment in executing a decoding operation and an estimated value of the amount of operations in a case where the decoding process is performed by the method according to the first embodiment.

There are two types of decoding processes in the method according to the present embodiment, that is, a low-accuracy whole decoding process and a high-accuracy partial decoding process. A captured image used in the low-accuracy whole decoding process is a low-resolution whole imaging obtained by reducing resolution of a high-resolution whole captured image directly obtained by coded imaging of the imaging apparatus 1. A low-resolution whole captured image is, for example, the low-resolution whole captured image P2 illustrated in the upper part of FIG. 9 obtained by reducing the resolution of the high-resolution whole captured image P1 illustrated in FIG. 7. On the other hand, a captured image used for the high-accuracy partial decoding process is the high-resolution partial captured image PR1 that is an image of the partial region R1 set as a region considered to be highly important in the high-resolution whole captured image P1.

In a case where the low-accuracy whole decoding process is performed on the low-resolution whole captured image P2, for example, the environment in executing the decoding operation and the estimated value of the amount of operations as illustrated in FIG. 10 can be considered. As illustrated in a right-side column of a table in FIG. 10, for example, an operation range is a whole image, an image area is 5×5 (relative value), the number of pixels per unit area is 1×1 (relative value), the number of types of point spread functions used in one operation of the decoding process is five, and the number of times of the decoding process executed per unit time is fifteen. One pixel in the low-resolution whole captured image P2 corresponds to 4×4 pixels in the high-resolution whole captured image. When the decoding process is executed in such an environment, the amount of operations required for the decoding process per unit time can be expressed as a value obtained by multiplying all these numbers, and is 1,875 (relative value) in this example.

Furthermore, in a case where the high-accuracy partial decoding process is performed on the high-resolution partial captured image PR1, for example, the environment in executing the decoding operation and the estimated value of the amount of operations as illustrated in FIG. 10 can be considered. As illustrated in a left-side column of a table in FIG. 10, for example, an operation range is a partial image, an image area is 1×1 (relative value), the number of pixels per unit area is 4×4 (relative value), the number of types of point spread functions used in one operation of the decoding process is twenty five, and the number of times of the decoding process executed per unit time is sixty. An area of the partial image, that is, the high-resolution partial captured image PR1 is ⅟25 of the whole captured image. When the decoding process is executed in such an environment, the amount of operations required for the decoding process per unit time can be expressed as a value obtained by multiplying all these numbers, and is 24,000 (relative value) in this example.

The amount of operations required for the decoding process per unit time in the method according to the present embodiment is a value obtained by adding the amount of operations of the low-accuracy whole decoding process and the amount of operations of the high-accuracy partial decoding process, and is 25, 875 (relative value) in the present example.

FIG. 11 is a diagram in which the estimated value of the amount of operations in the reference method and the estimated value of the amount of operations in the method according to the present embodiment are described side by side. As can be seen from FIG. 11, the amount of operations in the method according to the present embodiment can be reduced to about 4.3% of the amount of operations in the reference method. That is, an operation speed can be increased while securing necessary information in the decoding process according to the present embodiment.

FIG. 12 is a diagram in which an estimated value of a data amount of a depth map obtained by the reference method and an estimated value of a data amount of a depth map obtained by the method according to the present embodiment are described side by side. The data amount of the depth map can be considered to be proportional to the number of pixels of a decoded image obtained by decoding. Since the operation range is the whole image, the image area is 5×5 (relative value), and the number of pixels per unit area is 4×4 (relative) in the environment in executing the decoding operation by the reference method, the data amount can be estimated to be 400 (relative value) by multiplying all these values.

On the other hand, in the environment in executing the decoding operation by the method according to the present embodiment, the operation range includes the partial image and the whole image. In a case where the operation range is the partial image, since the image area is 1×1 (relative value) and the number of pixels per unit area is 4×4 (relative value), the data amount can be estimated to be sixteen (relative value) by multiplying all these values. Furthermore, in a case where the operation range is the whole image, since the image area is 5×5 (relative value) and the number of pixels per unit area is 1×1 (relative value), the data amount can be estimated to be twenty five (relative value) by multiplying all these values. In the method according to the present embodiment, a combined depth map is used by combining these, and thus the data amount of the depth map handled in the imaging apparatus 1 can be estimated to be forty one (relative value) by adding these.

As can be seen from FIG. 12, the data amount of the depth map in the method according to the present embodiment can be reduced to about 10% of the data amount of the depth map in the reference method. That is, the amount of data transfer of the depth map can be reduced according to the present embodiment, and thus a data transfer speed can be increased while securing necessary information in the decoding process.

As described above, it is possible to increase the operation speed and the data transfer speed while securing the necessary information according to the present embodiment in a case where the depth map is generated based on the coded imaging. As a result, for example, a frame rate of the coded imaging can be increased, resolution of the imaging element can be increased, or performance of the processor can be suppressed to reduce a component cost.

Second Embodiment

A depth map generation method according to a second embodiment of the invention of the present application will be described. A depth map generation method according to a second embodiment is a depth map generation method including: an imaging process of capturing an image of a subject by coded imaging using a coded imaging system to obtain a first captured image; an image generation process of reducing resolution of the first captured image to obtain a second captured image; a partial region setting process of setting a partial region in the first captured image; a process of performing a first decoding process on a partial image corresponding to the partial region in the first captured image to obtain a first depth map; and a process of performing a second decoding process on the second captured image to obtain a second depth map.

According to such a depth map generation method, it is possible to provide a more practical DFD technique as in the first embodiment. More specifically, according to this depth map generation method, it is possible to suppress the amount of operations of the decoding processes as a whole and to achieve an increase in speed of arithmetic processing or an increase in data transfer speed while securing high accuracy of depth estimation of a portion considered to be important in a subject. As a result, it is possible to enhance practicality in a depth estimation technique based on DFD.

Third Embodiment

A program according to a third embodiment of the invention of the present application will be described. The program according to the third embodiment is a program for causing a computer to execute: an imaging process of capturing an image of a subject by coded imaging using a coded imaging system to obtain a first captured image; an image generation process of reducing resolution of the first captured image to obtain a second captured image; a partial region setting process of setting a partial region in the first captured image; a process of performing a first decoding process on a partial image corresponding to the partial region in the first captured image to obtain a first depth map; and a process of performing a second decoding process on the second captured image to obtain a second depth map.

The present program may be a program for causing a computer to function as the arithmetic control unit 30 included in the imaging apparatus according to the first embodiment. Furthermore, the present program may be a program for causing a computer to execute the subject depth estimation method according to the second embodiment.

Note that a non-transitory tangible computer-readable recording medium in which the above-described program is recorded is also an embodiment of the invention of the present application.

According to such a program, a more practical DFD technique can be provided similarly to the first embodiment. More specifically, according to the present program, as the computer executes the program, it is possible to suppress the amount of operations of the decoding processes as a whole and to achieve an increase in speed of arithmetic processing or an increase in data transfer speed while securing high accuracy of depth estimation of a portion considered to be important in a subject similarly to the first embodiment. As a result, it is possible to enhance practicality in a depth estimation technique based on DFD.

Although various embodiments of the present invention have been described above, the present invention is not limited to the above-described embodiments, includes various and modifications. Furthermore, the above-described embodiments have been described in detail in order to describe the present invention in an easy-to-understand manner, and are not necessarily limited to those having all the described configurations. Furthermore, some configurations of one embodiment can be replaced with configurations of another embodiment, and configurations of one embodiment can be added to configurations of another embodiment. All of these fall within the scope of the present invention. Moreover, numerical values or the like included in the text and the drawings are merely examples, and effects of the present invention are not impaired even if different numerical values or the like are used.

What is claimed is:

1. An imaging apparatus comprising:
a coded imaging system; and
an arithmetic control unit,
wherein the arithmetic control unit is configured to execute:
an imaging process of controlling the coded imaging system to capture an image of a subject by coded imaging and obtain a first captured image;
an image generation process of reducing resolution of the first captured image to obtain a second captured image;
a partial region setting process of setting a partial region in the first captured image;
a process of performing a first decoding process on a partial image corresponding to the partial region in the first captured image to obtain a first depth map; and
a process of performing a second decoding process on the second captured image to obtain a second depth map.

2. The imaging apparatus according to claim 1, wherein the arithmetic control unit is configured to execute a process of superimposing the first depth map on the second depth map to obtain a third depth map.

3. The imaging apparatus according to claim 1, wherein the first decoding process is a process of applying a first number of types of point spread functions, and wherein the second decoding process is a process of applying a second number of types of point spread functions, the second number being smaller than the first number.

4. The imaging apparatus according to claim 1,
wherein the imaging process is repeatedly executed a plurality of times,
wherein the first decoding process is performed at a first frequency, and
wherein the second decoding process is performed at a second frequency lower than the first frequency.

5. The imaging apparatus according to claim 1,
wherein the arithmetic control unit executes a process of outputting, to an external device, the first depth map and the second depth map or a third depth map obtained by superimposing the first depth map on the second depth map.

6. The imaging apparatus according to claim 5,
wherein the external device is a device that assists driving of a transportation.

7. The imaging apparatus according to claim 1,
wherein the coded imaging system is installed in a transportation and performs the coded imaging in front of the transportation.

8. The imaging apparatus according to claim 1,
wherein the partial region is set at a center of the first captured image.

9. The imaging apparatus according to claim 1,
wherein the partial region is set at a position designated by a user.

10. The imaging apparatus according to claim 1,
wherein the partial region is set based on an analysis result of the first captured image.

11. A depth map generation method comprising:
an imaging process of capturing an image of a subject by coded imaging using a coded imaging system to obtain a first captured image;
an image generation process of reducing resolution of the first captured image to obtain a second captured image;
a partial region setting process of setting a partial region in the first captured image;
a process of performing a first decoding process on a partial image corresponding to the partial region in the first captured image to obtain a first depth map; and
a process of performing a second decoding process on the second captured image to obtain a second depth map.

12. The depth map generation method according to claim 11,
wherein an arithmetic control unit is configured to execute a process of superimposing the first depth map on the second depth map to obtain a third depth map.

13. The depth map generation method according to claim 11,
wherein the first decoding process is a process of applying a first number of types of point spread functions, and
wherein the second decoding process is a process of applying a second number of types of point spread functions, the second number being smaller than the first number.

14. The depth map generation method according to claim 11,
wherein the imaging process is repeatedly executed a plurality of times,
wherein the first decoding process is performed at a first frequency, and
wherein the second decoding process is performed at a second frequency lower than the first frequency.

15. The depth map generation method according to claim 11,
wherein an arithmetic control unit executes a process of outputting, to an external device, the first depth map and the second depth map or a third depth map obtained by superimposing the first depth map on the second depth map.

16. The depth map generation method according to claim 15,
wherein the external device is a device that assists driving of a transportation.

17. The depth map generation method according to claim 11,
wherein the coded imaging system is installed in a transportation and performs the coded imaging in front of the transportation.

18. The depth map generation method according to claim 11,
wherein the partial region is set at a center of the first captured image.

19. The depth map generation method according to claim 11,
wherein the partial region is set at a position designated by a user.

20. A non-transitory tangible computer-readable recording medium storing a program for causing a computer to execute:
an imaging process of capturing an image of a subject by coded imaging using a coded imaging system to obtain a first captured image;
an image generation process of reducing resolution of the first captured image to obtain a second captured image;
a partial region setting process of setting a partial region in the first captured image;
a process of performing a first decoding process on a partial image corresponding to the partial region in the first captured image to obtain a first depth map; and
a process of performing a second decoding process on the second captured image to obtain a second depth map.

* * * * *